(12) United States Patent
Turano et al.

(10) Patent No.: US 11,461,495 B2
(45) Date of Patent: Oct. 4, 2022

(54) COGNITIVE SCREENING OF ATTACHMENTS

(71) Applicant: International Business Machines Corporation, Armonk, NY (US)

(72) Inventors: Mark Turano, Clifton, NJ (US); Zachary A. Silverstein, Jacksonville, FL (US); Robert Huntington Grant, Marietta, GA (US); Thomas Jefferson Sandridge, Tampa, FL (US)

(73) Assignee: International Business Machines Corporation, Armonk, NY (US)

( * ) Notice: Subject to any disclaimer, the term of this patent is extended or adjusted under 35 U.S.C. 154(b) by 445 days.

(21) Appl. No.: 16/693,326

(22) Filed: Nov. 24, 2019

(65) Prior Publication Data

US 2021/0157950 A1    May 27, 2021

(51) Int. Cl.
    *G06F 21/62*    (2013.01)
    *G06N 20/00*    (2019.01)
    *G06Q 10/06*    (2012.01)

(52) U.S. Cl.
    CPC ......... *G06F 21/6245* (2013.01); *G06N 20/00* (2019.01); *G06Q 10/0635* (2013.01)

(58) Field of Classification Search
    None
    See application file for complete search history.

(56) References Cited

U.S. PATENT DOCUMENTS 5,960,080 A * 9/1999 Fahlman ............. G06F 21/6209
                                                        715/255
8,448,246 B2   5/2013 Guerrero et al.
9,414,779 B2   8/2016 Kanevsky et al.
2006/0048224 A1  3/2006 Duncan et al.
2006/0075228 A1* 4/2006 Black .................... H04L 63/104
                                                        713/167
2011/0252109 A1  10/2011 Steele
2012/0011192 A1   1/2012 Meister et al.
(Continued)

FOREIGN PATENT DOCUMENTS

WO    2010011188 A1    1/2010

OTHER PUBLICATIONS

"Detecting Unauthorized Recipients of Sensitive Email Content", An IP.com Prior Art Database Technical Disclosure, Authors et. al.: Disclosed Anonymously, IP.com Disclosure No. IPCOM000218057D, Publication Date: May 17, 2012, 3 pages.
(Continued)

*Primary Examiner* — William J. Goodchild
(74) *Attorney, Agent, or Firm* — Monchai Chuaychoo (57) ABSTRACT

An approach for cognitively processing documents to ameliorate inadvertent sharing of sensitive information during electronic communications is disclosed. The approach determines a first context and historical context of an electronic communication being prepared for transmission. The approach determines one or more risk scores based on the first context and the historical context. The approach assigns the one or more risk scores to the first context and the historical context and determining whether the one or more risk scores exceed one or more predetermined thresholds. The approach executes an action plan to prevent sensitive document from being transmitted should the risk score exceed the threshold.

20 Claims, 4 Drawing Sheets

(56) References Cited

U.S. PATENT DOCUMENTS

2014/0165137 A1* 6/2014 Balinsky ............... H04L 63/20
                                                          726/1
2014/0230066 A1   8/2014 Hurwitz et al.
2016/0014148 A1*  1/2016 Lee ..................... H04L 63/168
                                                          726/22
2016/0285893 A1*  9/2016 Childress ............. H04L 63/04
2016/0308814 A1  10/2016 Meister et al.
2019/0019154 A1*  1/2019 Girdhar ............... H04W 12/06
2019/0188402 A1*  6/2019 Wang ................... G06N 3/08

OTHER PUBLICATIONS

"Mechanism to Sanity Check and Score Email Content and Attachments", An IP.com Prior Art Database Technical Disclosure, Authors et. al.: Disclosed Anonymously, IP.com Disclosure No. IPCOM000217098D, Publication Date: May 2, 2012, 3 pages.

* cited by examiner

COGNITIVE SCREENING OF ATTACHMENTS

BACKGROUND

The present invention relates generally to the field of telecommunication and more particularly to securing attachments associated with electronic communication.

Electronic messaging has become ubiquitous as a form of communication between individuals in the social and/or business capacity. In a business capacity, email has been used superfluously throughout business organizations. Furthermore, files (e.g., spreadsheets, pictures, etc.) have been attached to emails correspondence within all organization. Attachments could include salary information, forecast sales figure, presentation outlining a company's business strategy.

Reputational risk is the potential loss to financial capital, social capital and/or market share resulting from damages to a firm's reputation. The cost of accidental data breach (e.g., electronic/soft copy, hard copy, etc.) for companies reaches thousands of dollars a year per incident, and even more in reputation risk and damage. Thus, when an email with sensitive attachment (i.e., forecast sales figure) is sent to the wrong recipient, the risk of accidentally sharing confidential competitor and internal data is heightened.

SUMMARY

Aspects of the present invention disclose a computer-implemented method, computer program product, and computer system for processing documents to ameliorate inadvertent sharing of sensitive information during electronic communications. The computer implemented method includes determining a first context, by leveraging machine learning, of an electronic communication being prepared for transmission; determining a historical context, by leveraging machine learning, of the electronic communication; determining, by leveraging machine learning, one or more risk scores based on the first context and the historical context; assigning, by leveraging machine learning, the one or more risk scores to the first context and the historical context; determining, by leveraging machine learning, whether the one or more risk scores exceed one or more predetermined thresholds based on machine learning; and responsive to the one or more risk scores exceeding the one or more predetermined thresholds, executing, by leveraging machine learning, an action plan.

In another embodiment, the computer program product includes one or more computer readable storage media and program instructions stored on the one or more computer readable storage media, the program instructions comprising: program instructions to determine a first context, by leveraging machine learning, of an electronic communication being prepared for transmission; program instructions to determine a historical context, by leveraging machine learning, of the electronic communication; program instructions to determine, by leveraging machine learning, one or more risk scores based on the first context and the historical context; program instructions to assign, by leveraging machine learning, the one or more risk scores to the first context and the historical context; program instructions to determine, by leveraging machine learning, whether the one or more risk scores exceed one or more predetermined thresholds based on machine learning; and responsive to the one or more risk scores exceeding the one or more predetermined thresholds, program instructions to execute, by leveraging machine learning, an action plan.

In another embodiment, the computer system includes one or more computer processors; one or more computer readable storage media; program instructions stored on the one or more computer readable storage media for execution by at least one of the one or more computer processors, the program instructions comprising: program instructions to determine a first context, by leveraging machine learning, of an electronic communication being prepared for transmission; program instructions to determine a historical context, by leveraging machine learning, of the electronic communication; program instructions to determine, by leveraging machine learning, one or more risk scores based on the first context and the historical context; program instructions to assign, by leveraging machine learning, the one or more risk scores to the first context and the historical context; program instructions to determine, by leveraging machine learning, whether the one or more risk scores exceed one or more predetermined thresholds based on machine learning; and responsive to the one or more risk scores exceeding the one or more predetermined thresholds, program instructions to execute, by leveraging machine learning, an action plan.

DETAILED DESCRIPTION

Embodiments of the present invention provides the ability to cognitively process documents (i.e., email attachment, text attachments, etc.) being transmitted that may contain sensitive information and take active steps to prevent accidentally/inadvertently sending that sensitive document. For example, userA is a software developer for companyXYZ and userA is scheduled to give a presentation to a potential client, clientABC. UserA is preparing the presentation on his PC but inadvertently included some confidential figures (i.e., expected profits based on client, charging rates for the client, etc.) on the presentation file. Embodiment would scan the attached presentation and discover that the file contains sensitive information (i.e., assigning one or more risk score) associated with companyXYZ and would prompt/notify userA from attaching the file until sensitive information (i.e., score exceeds a risk threshold) is removed from the presentation for clientABC.

In an alternative embodiment, userA is texting userB regarding a business meeting. Both userA and userB work for the same company and was texting regarding the sales presentation at the meeting. UserA and userB were recording images (e.g., static or dynamic) of the presentation. Spouse of userA text userA asking the estimated time of arrival to attend the daughter's soccer practice and asked userA to send a picture of soccer cleats that their daughter wanted for her birthday. UserA inadvertently attaches the recording of the business meeting and press send. Embodiment on the mobile device would notify userA that the attached picture is deem restrictive and prompt user to reconsider sending. UserA is given a choice to reconsider attaching another picture or send without attachment.

A detailed description of embodiments of the claimed structures and methods are disclosed herein; however, it is to be understood that the disclosed embodiments are merely illustrative of the claimed structures and methods that may be embodied in various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the methods and structures of the present disclosure.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

Figure 1:
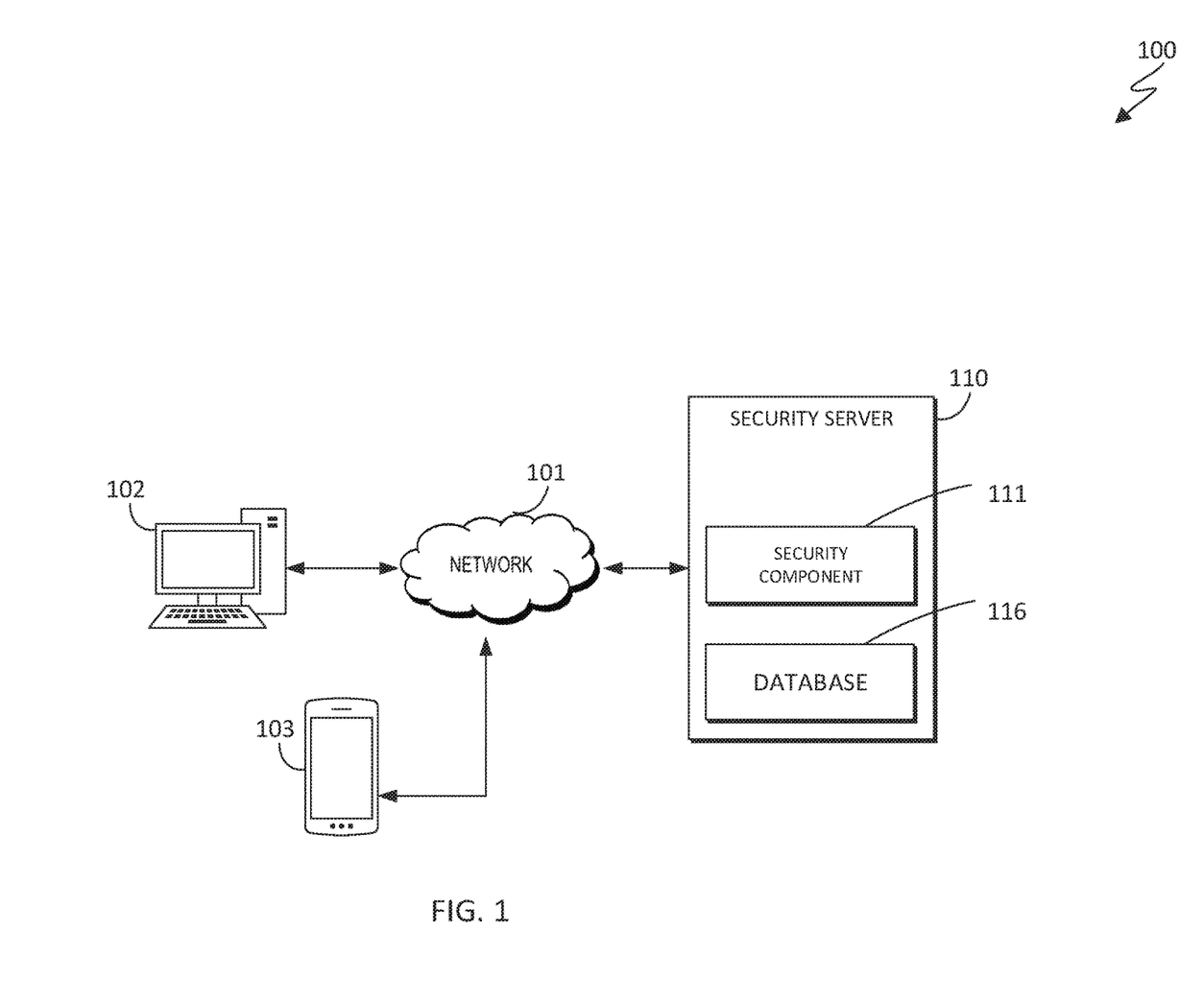
FIG. 1 is a functional block diagram illustrating a topology of a security environment, designated as 100, in accordance with an embodiment of the present invention.

FIG. 1 is a functional block diagram illustrating a topology of a security environment, designated as 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Security environment 100 includes client computing device 102, mobile computing device 103, and security server 110. All (e.g., 102, 103, and 110) elements can be interconnected over network 101.

Network 101 can be, for example, a telecommunications network, a local area network (LAN), a wide area network (WAN), such as the Internet, or a combination of the three, and can include wired, wireless, or fiber optic connections. Network 101 can include one or more wired and/or wireless networks that are capable of receiving and transmitting data, voice, and/or video signals, including multimedia signals that include voice, data, and video information. In general, network 101 can be any combination of connections and protocols that can support communications between security server 110 and other computing devices (not shown) within security environment 100. It is noted that other computing devices can include, but is not limited to, client computing device 102 and any electromechanical devices capable of carrying out a series of computing instructions.

Client computing device 102 represents a network capable mobile computing device that may receive and transmit confidential data over a wireless network. Mobile computing device 102 can be a laptop computer, tablet computer, netbook computer, personal computer (PC), a personal digital assistant (PDA), a smart phone, smart watch (with GPS location) or any programmable electronic device capable of communicating with server computers (e.g., security server 110) via network 101, in accordance with an embodiment of the present invention.

Mobile computing device 103 represents a network capable mobile computing device that may receive and transmit confidential data over a wireless network. Mobile computing device 103 can be a laptop computer, tablet computer, netbook computer, personal computer (PC), a personal digital assistant (PDA), a smart phone, smart watch (with GPS location) or any programmable electronic device capable of communicating with server computers (e.g., security server 110) via network 101, in accordance with an embodiment of the present invention.

Security server 110 can be a standalone computing device, a management server, a web server, a mobile computing device, or any other electronic device or computing system capable of receiving, sending, and processing data. In other embodiments, security server 110 can represent a server computing system utilizing multiple computers as a server system, such as in a cloud computing environment. In another embodiment, security server 110 can be a laptop computer, a tablet computer, a netbook computer, a personal computer (PC), a desktop computer, a personal digital assistant (PDA), a smart phone, or any other programmable electronic device capable of communicating other computing devices (not shown) within 100 via network 101. In another embodiment, security server 110 represents a computing system utilizing clustered computers and components (e.g., database server computers, application server computers, etc.) that act as a single pool of seamless resources when accessed within security environment 100.

Security server 110 includes security component 111 and database 116.

Security component 111 enables the present invention to communicate, manage and screen sensitive documents to electronic communication. It is noted that documents can include photos, spreadsheets, word documents, presentation, video recording, etc. Essentially, security component 111 can i) determine context of attached document, ii) determine historical context of current document (being examined) against similar documents, iii) retrieve rules/thresholds of alerting/notifying based on the risk rating of the document and iv) provide a custom response to the user on why the content is deemed restrictive and requiring a second read through/screening by the user. Is it noted that cognitive computing can be utilized throughout the entire process (i.e., beginning to end) or part of the process/component of the system. Security component 111 will be described in greater details in regard to FIG. 2.

Database 116 is a repository for data used by security component 111. Database 116 can be implemented with any type of storage device capable of storing data and configuration files that can be accessed and utilized by security server 110, such as a database server, a hard disk drive, or a flash memory. Database 116 uses one or more of a plurality of techniques known in the art to store a plurality of information. In the depicted embodiment, database 116 resides on security server 110. In another embodiment, database 116 may reside elsewhere within security environment 100, provided that security component 111 has access to database 116. Database 116 may store information associated with, but is not limited to, corpus knowledge of tables of risk scores, risk score threshold, roles of employees, context of sensitive materials, list of sensitive company documents, etc.

Figure 2:
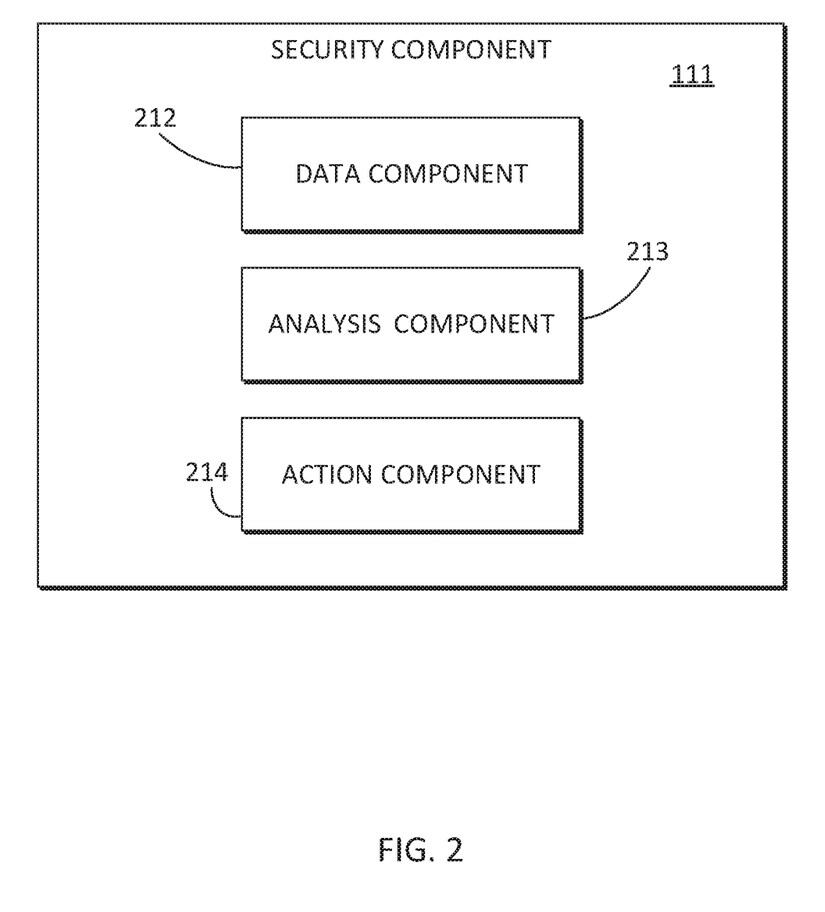
FIG. 2 is a functional block diagram illustrating security component in accordance with an embodiment of the present invention.

FIG. 2 is a functional block diagram illustrating security component 111 in accordance with an embodiment of the present invention. In the depicted embodiment, security component 111 includes data component 212, analysis component 213 and action component 214.

As is further described herein below, data component 212, of the present invention provides the capability of, by leveraging machine learning, gathering and discerning historical information (e.g., user's role, data used by the user, relationship between user and clients, sensitivity threshold, previous interaction between the users, etc.) associated with the user's email communication. Information regarding user's role can include, but it is not limited to, security level of the user, security override, internal versus external role and confidentiality exposure of content. Internal role within a company means that the user does not interface with external clients versus external roles where that user frequently interacts with clients. Certain keyword and flags can be leveraged by machine learning to understand the internal versus external roles. Historical information between the users (including clients) can be used as additional context by machine learning (i.e., analysis component 213) to understand and score the risk associated with the attachment. For example, interaction between the parties can include i) what type of documents are typically shared/attached, ii) what is the metadata of the attached document, iii) typical sentiment of the metadata, iv) length of notes and specific components captures via NLC/NLU (natural language classifier/natural language understanding) and iv) other users copied on the email communication.

In summary historical information can include, but it is not limited to, information based on previous interactions between parties of the electronic communications, the type of electronic communications be sent, metadata of the communications, sentiment of the metadata, natural language indicators of sensitive information, additional recipients copied on the electronic communication, the evolution of the electronic communications (i.e. multiple versions of a document) and previous communication threads flagged as violation of internal policies.

For illustrative purpose, a use case scenario will be described further. UserA and UserB both work for CompanyXYZ. UserA works as a compensation manager in the HR (Human Resources) department of CompanyA. UserB is an employment attorney for CompanyA. UserA and UserB has been emailing each other regarding a change to the current employee salary/compensation structure based on the new job bands. UserA has been emailing UserB with an excel spreadsheet with employee's name and salary as an example to create a new compensation model. However, UserB was in hurry to complete an email to request a bid from outside vendors regarding the company's upcoming picnic, instead of attaching the bid contract, UserB attaches the salary spreadsheet (used in the previous email with userA).

Data component 212 can gather historical information between userA and userB. For example, historical information can include previous email communication regarding the change to the current employee salary/compensation structure, version control of any attachment between the users, email header or words in the email body or in the attached file/document that may include sensitive words (e.g., CONFIDENTIAL, DO NOT SHARE, etc.).

As is further described herein below, analysis component 213, of the present invention provides the capability of determining the which documents attached to an electronic communication is considered restrictive based on the gathered data (i.e., data component 212). Analysis component 213 can use machine learning (e.g., NLU, NLP, etc.) to determine the context of the data and assign a risk rating (e.g., risk score, risk indicator, risk sensitivity index, etc.).

Context gathered by data component 213 can include attachment files and activities. For example, an email header stating "CONFIDENTIAL" can be recognized by machine learning (i.e., analysis component 213) as information that should be restricted (or reviewing previous email thread that was flagged for violation of internal company policy involving attachments). Other examples can include presence of locked documents and check in/check out status of those documents as an indicator to the machine learning (i.e., contextual processing) that the files are restrictive. Other contextual information related to the file can include i) does the user often treat this file by saving multiple versions, ii) has the user iteratively replaced the specific component (indicator of a template), iii) presence of inline notes and comments and iv) other documents for comparison that resides on user's computer. Information related to relationship between user and clients can be denote as i) type/kind of information being shared where the content classification of data shared to non-owned emails and ii) type/kind of information is open versus information that is monitored/restricted.

Another criterion can be used for contextual processing by the analysis component 213 is time decay algorithm, which could be used alter influence of older scoring on attachments. For example, time decay algorithm could take into account when the document was initially created (i.e., creation date), when it was last opened (i.e., last open date), whether the information has been updated in newer documents (i.e., current size compared against last open date), etc. This would enable older documents with time-sensitive information (such as the earnings release of a public company) to be scored less significantly after the information within the document became public knowledge. One implementation could be using a table below:

TABLE 1

| Age of Document | Overall Score Weighting (%) | Overall Score (1-10) |
| --- | --- | --- |
| 0-3 months | 100% | 8 |
| 3-9 months | 95% | 7.6 |
| 9-18 months | 85% | 6.8 |
| 18+ months | 70% | 5.6 |

It is noted that there are several risk thresholds and risk scores that can be calculated and assigned by analysis component 213. For example, risk scores can include, but it is not limited to, file risk score (FRS), role risk score (RRS), context risk score (CRS) and historical risk score (HRS). FRS can be defined as risk scores associated with attached file (see Table 2). CRS can be defined as risk score associated with the data being discussed in the electronic communication/correspondence (see Table 3). RRS can be defined as risk score associated with a role of users (see Table 4). HRS can be defined as risk score associated with historical interaction or lack of interaction between the email recipient and sender (see Table 5). Thus, there are corresponding risk thresholds to FRS, RRS, CRS and HRS. For example, a total risk threshold (TRT) is a summation of the following thresholds, activity risk threshold (FRT), risk role threshold (RRT), context risk threshold (CRT) and historical context threshold (HRT). All the risk threshold are user-selectable and adjustable (i.e. predetermined). It is noted that a numerical scale can be determined and agreed upon before system initialization. Additionally, the threshold can be automatically adjusted by the cognitive computing component based on a learned pattern (e.g., observed pattern, new training data, etc.). Table 2 through Table 5 contains a scale range of 1 to 10 (i.e., 10 designated as the most sensitive/restrictive and 1 designated as the least). Depending on the configuration, more tables and criteria can be added to the system as the language and custom norms evolves over time. It is noted that security component 111 can rely on other type of risk scoring that does not rely on tables. For examples, security component 111, over time via machine learning, can make decision without relying on scoring tables and use internal model and/or experience to make that risk determination.

TABLE 2

| File Type | Overall Score (1-10) |
|---|---|
| Spreadsheet (xls, etc.) | 9 |
| Graphic (jpeg, mov, etc.) | 3 |
| text documents (doc, pdfs, txt, etc.) | 6 |
| Executable (exe, batch, etc.) | 1 |

Furthermore, analysis component 213 can be trained to via NLU/NLC or any machine learning method to understand the context of data discussed during the electronic correspondence to determine the sensitivity and risk and assigned a CRS.

TABLE 3

| Keywords/Context | Overall Score (1-10) |
|---|---|
| TEMPLATE, LOGO | 2 |
| DO NOT SHARE, PRIVILEGED, CONFIDENTIAL PLEASE REMOVE | 10 |
| SALARY, SOCIAL SECURITY NUMBER | 7 |
| (Any verbiage not assigned a risk core of 7 or above can be included in here) | 1 |

TABLE 4

| Employee Role | Overall Score (1-10) |
|---|---|
| Attorney Staff | 9 |
| General Administrative Staff | 5 |
| Executive Administrative Staff | 7 |
| Facilities Staff | 1 |
| Vice President level and above | 9 |
| Compensation Staff | 10 |
| Graphics Stuff | 2 |

TABLE 5

| Historical Context | Overall Score (1-10) |
|---|---|
| No prior history of communication | 10 |
| Prior history of communication | 1 |
| No prior document history in communication | 7 |
| Previous document history in communication | 2 |

Analysis component 213, by leveraging machine learning, can learn about historical information (through data component 212) of users. Referring to the prior use case with UserA and UserB. UserA sends an email attachment (containing salary spreadsheet) to outside vendor. Security component 111 can begin to gather data after user presses SEND or after userA attaches the file to be sent to the vendor. Security component 111 can find no prior electronic communication between userA and vendor. Thus, security component 111 has identified that this current attachment may posed a risk. Furthermore, security component 111 gather information associated with the role of userA and outside vendor. Embodiment cannot find any roles associated with companyXYZ for the vendor. Security component 111 has assigned RRS to userA as 10 (per Table 4) vendor is assigned RRS of "NA" (Not Available which can be assigned a 0 or 1). And security component 111 has assigned a CRS of 7 to the attachment based on the word "SALARY" found on the spreadsheet (see Table 3). Security component 111 has assigned an FRS of 9 based on the file type (see Table 2). All thresholds (FRT, RRT, CRT) are set at 7. The combined risk score is 28 and the combined thresholds is 21. It is noted that CRS score can be the mathematical average of scores related to the context since there can be more than one items discussed or shared (attached).

It is further noted that analysis component 213, through machine learning, can use just one risk score to compare against a threshold instead of relying on all four risk scores against all four risk thresholds. For example, userC, (graphic artist with an RRS of 2) received an email from userA with attached salary spreadsheet. Both average ARS for userA and userC is 6. Thus, this would not exceed the RRT of 7. However, the spreadsheet attachment has a CRS of 7 and FRS of 9. Thus, both of these scores would exceed CRT and FRT, respectively. The embodiment can learn (e.g., cognitive learning) to use either one or multiple scores and threshold to make that determination.

As is further described herein below, action component 214, of the present invention provides the capability of, by leveraging machine learning, recommending and taking action (i.e., generating one or more action plans) to ameliorate the risk of sending sensitive attachments via electronic communication. The plan can include i) prompting user to remove sensitive information from the document (i.e., re-attach the proper file) and ii) send without attachment.

In summary, security component 111 can process contextual information by leveraging crowd sourcing and machine learning based on i) document patterns (what do other users typically do with this document, send it to non-company email address?), ii) natural language flags (e.g., "PLEASE REMOVE", "TEMPLATE", etc.), iii) contextual determinants (i.e., personal notes that NLC determines is private associated or informal), iv), private URL cross referencing (e.g., internal URLs or confidential information that may be related to specific client), v) previous sender history, vi) sentiment and NLC/NLU, vii) multiple copies of the same document (i.e., personal and private version control), and viii) other similar documents and what has been attached previously (i.e., 3 documents without notes versus 1 document now with notes).

Figure 3:
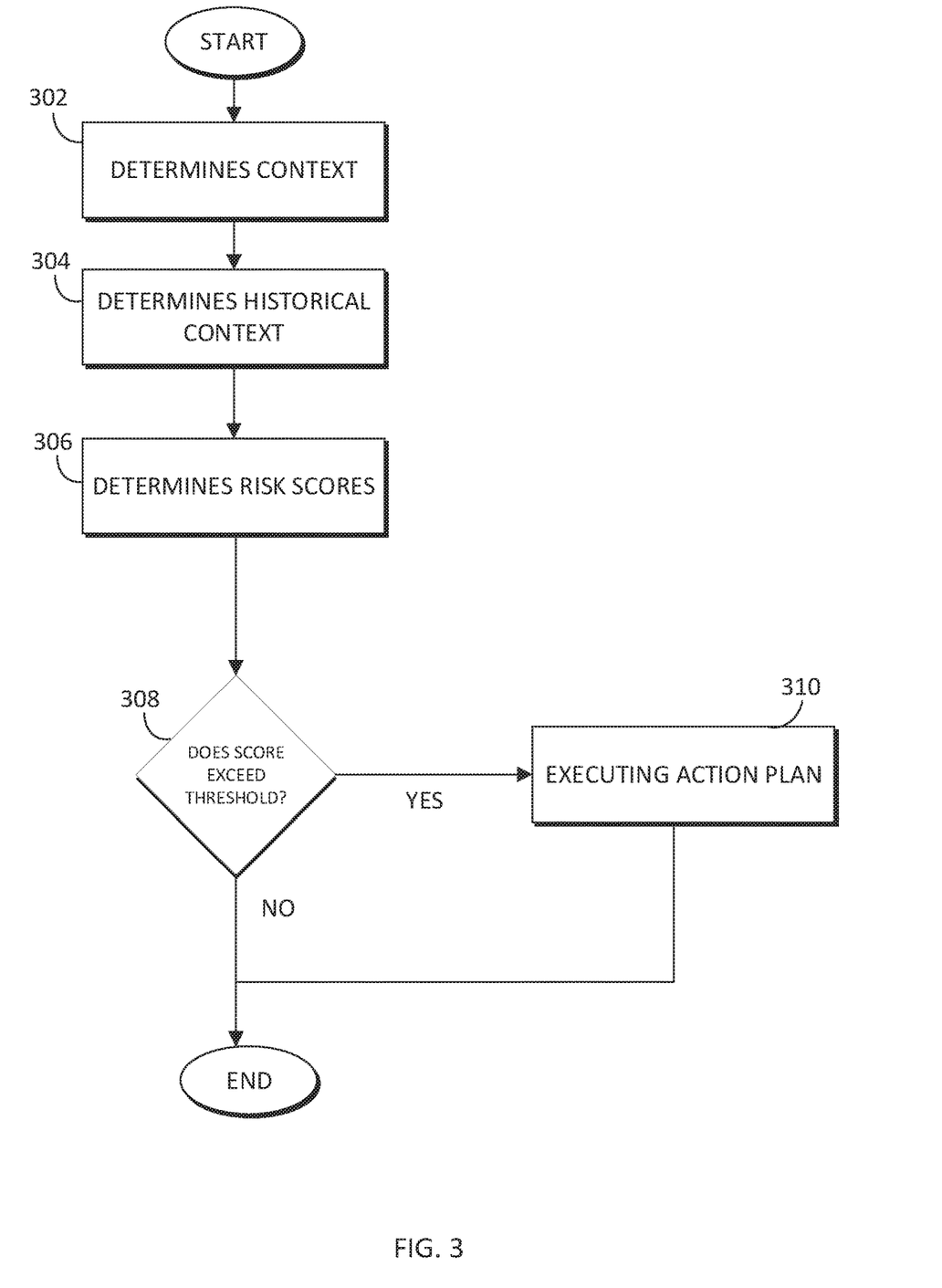
FIG. 3 is a flowchart illustrating the operation of a security management system, designated as 300, in accordance with an embodiment of the present invention.

FIG. 3 is a flowchart illustrating the operation of a security environment 100, designated as 300, in accordance with an embodiment of the present invention.

Security component 111 determines context (step 302). In an embodiment, security component 111, determines the context of the electronic communication and/or attached documents being prepared for transmission. For example, referring to the prior user case scenario, userA has attached a sensitive spreadsheet to be sent to vendor (by mistake). Security component 111 can start analyzing the current communication between userA and vendor to determine the context and assigning a risk score.

Security component 111 determines historical context (step 304). In an embodiment, security component 111, through data component 212, gathers historical data related to the users and email recipients of the electronic communication. Based on the gathered historical data, security component 111, determines the historical context. For example, security component 111 can gather historical data between userA and vendor. Historical data can also include user's role and data associated with the user. For example, data component 212, begins to gather "historical" data (e.g., topic of discussion between userA and vendor, historical interactions between userA and vendor).

Security component 111 determines risks scores (step 306). In an embodiment, security component 111, through analysis component 213, based on the context from step 304 and step 302, determines one or more risks scores. For example, there are no prior historical interaction between userA and vendor (based on the determination by analysis component 213) then analysis component 213 can assign an HRS of 9. And FRS was determined by analysis component 213 to be risky and was assigned a score of 9 (per Table 2). Furthermore, security component 111 can assign an RRS for userA of 10. Security component 111 can also assign a CRS of 10 for the salary spreadsheet document (i.e., titled "SALARY" on the spreadsheet).

Security component 111 determine whether the risks scores exceeds one or more thresholds (decision block 308). In an embodiment, security component 111, through analysis component 213, determine if the risk scores of assigned to the attached file meets or exceeds a threshold. If analysis component 213 has determined that the attachment exceeds a risk threshold ("YES" branch of decision block 308), analysis component 213 proceeds to step 310. For example, from the prior user case, userA an RRS of 10 (per Table 4) and CRS of 10. RRT and CRT is set at 7. RRS exceeds RRT (i.e., 10 is greater than 7) and CRS exceeds CRT. However, if analysis component 213 has determined that the attachment is not sensitive ("NO" branch of decision block 308), analysis component 213 proceeds to allow the user to send the email with the attachment.

Security component 111 executes an action plan (step 310). In an embodiment, security component 111, through action component 214, generates an action plan to minimize the risk of sending sensitive email attachment. The action plan can include, but it is not limited to, alerting (e.g., mobile alert, system prompt, etc.) and warning the user of sending potential attachment. For example, security component 111 has deemed that the salary spreadsheet attached to the email from userA to vendor is sensitive and prompts users to reconsider after user has press send (the first time). UserA then removes the attachment and resends the email.

The present invention may be a system, a method, and/or a computer program product. The computer program product may include a computer readable storage medium (or media) having computer readable program instructions thereon for causing a processor to carry out aspects of the present invention.

Figure 4:
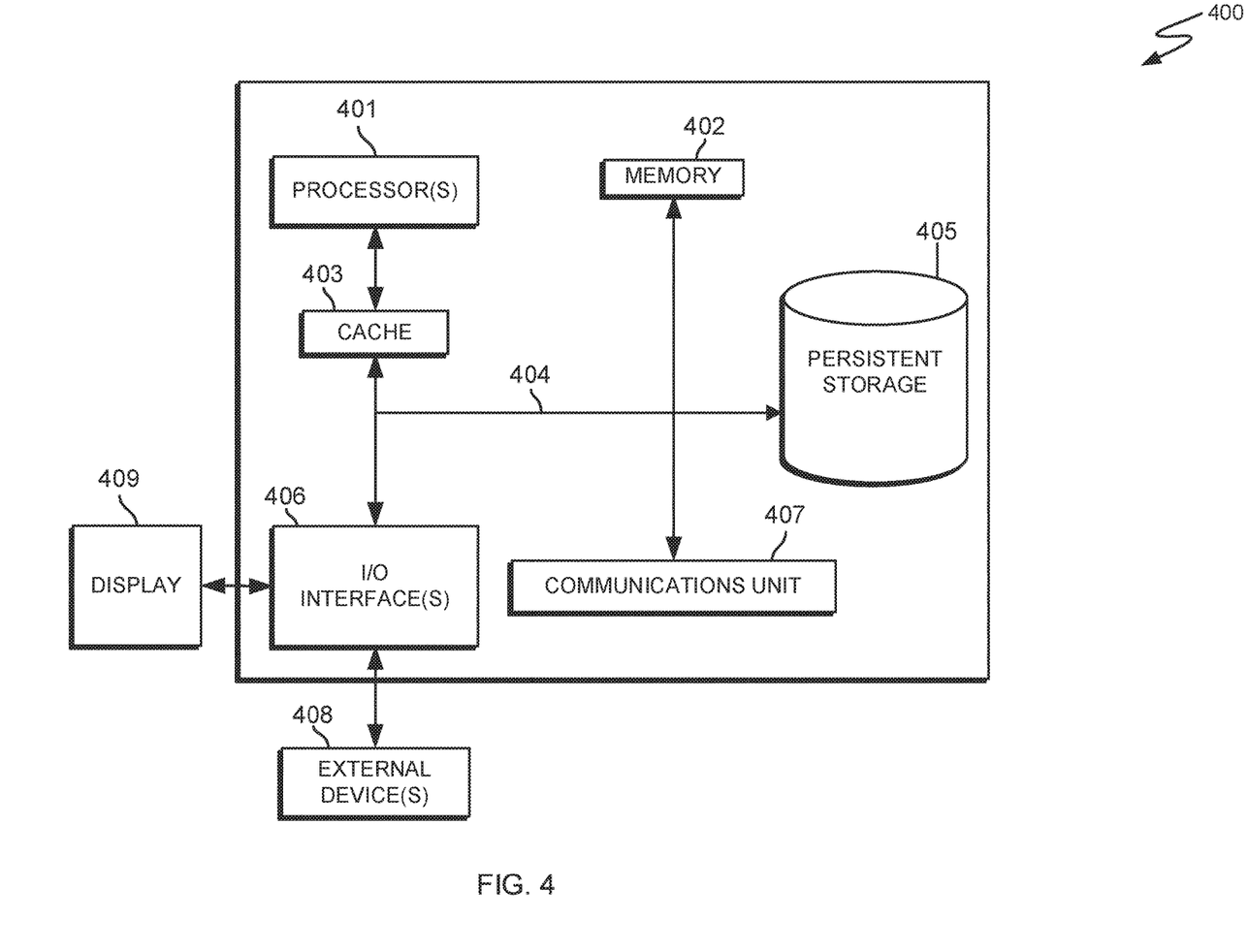
FIG. 4 depicts a block diagram, designated as 400, of components of a server computer capable of executing the security management system within the security environment, of FIG. 1, in accordance with an embodiment of the present invention.

FIG. 4 depicts a block diagram of components of ad intelligence component 111 application, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

FIG. 4 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data (e.g., software and datax 10) used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Ad intelligence component 111 can be stored in persistent storage 405 for access and/or execution by one or more of the respective processor(s) 401 via cache 403.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data (e.g., Ad intelligence component 111) used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Program instructions and data (e.g., Ad intelligence component 111) used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for cognitively processing documents to ameliorate inadvertent sharing of sensitive information during electronic communications comprising:
   determining a first context, by leveraging machine learning, of an electronic communication between one or more users being prepared for transmission further comprises of comprises of, reviewing and scoring the electronic communications based on a natural language indicators of sensitive information, content of the electronic communication and recipients of the electronic communication;
   determining a historical context, by leveraging machine learning, of the electronic communication;
   determining, by leveraging machine learning, one or more risk scores based on the first context and the historical context;
   assigning, by leveraging machine learning, the one or more risk scores to the first context and the historical context;
   determining, by leveraging machine learning, whether the one or more risk scores exceed one or more predetermined thresholds based on machine learning; and
   responsive to the one or more risk scores exceeding the one or more predetermined thresholds, executing, by leveraging machine learning, an action plan.

2. The computer-implemented method of claim 1, wherein the historical context comprises of information based on previous interactions between the one or more users of the electronic communications, type of electronic communications be sent, metadata of the communications, sentiment of the metadata, natural language indicators of sensitive information, additional recipients copied on the electronic communication, evolution of the electronic communications, previous communication threads flagged as violation of internal policies, presence of locked and check-in/check out status of one or more documents relating to the electronic communications and time decay algorithm.

3. The computer-implemented method of claim 2, wherein the time decay algorithm comprises:
   determining a creation date of one or more documents;
   determining last open date for the one or more documents;
   determining whether new information has been added to the one or more document by comparing the current size of the one or more document against and last open date; and
   determining whether the creation date, last open date and new information has been added and comparing against a pre-determined time decay table.

4. The computer-implemented method of claim 3, wherein contextual information related to the one or more documents further comprises, presence of inline notes and comments and other documents for comparison that resides on the or more user's computer.

5. The computer-implemented method of claim 1, wherein action plan further comprises of prompting the one or more users to remove sensitive information from the document and sending the electronic communication without the document.

6. The computer-implemented method of claim 1, wherein one or more risk scores further comprises of file risk score (FRS), role risk score (RRS), historical risks score (HRS) and context risk score (CRS).

7. The computer-implemented method of claim 1, wherein the one or more predetermined thresholds comprises of file risk threshold (FRT), role risk threshold (RRT), historical risk threshold (HRT) and context risk threshold (CRT).

8. A computer program product for cognitively processing documents to ameliorate inadvertent sharing of sensitive information during electronic communications, the computer program product comprising:
   one or more computer readable storage media and program instructions stored on the one or more computer readable storage media, the program instructions comprising:
      program instructions to determine a first context, by leveraging machine learning, of an electronic communication between one or more users being prepared for transmission further comprises of comprises of, reviewing and scoring the electronic communications based on a natural language indicators of sensitive information, content of the electronic communication and recipients of the electronic communication;
      program instructions to determine a historical context, by leveraging machine learning, of the electronic communication;
      program instructions to determine, by leveraging machine learning, one or more risk scores based on the first context and the historical context;
      program instructions to assign, by leveraging machine learning, the one or more risk scores to the first context and the historical context;
      program instructions to determine, by leveraging machine learning, whether the one or more risk scores exceed one or more predetermined thresholds based on machine learning; and
      responsive to the one or more risk scores exceeding the one or more predetermined thresholds, program instructions to execute, by leveraging machine learning, an action plan.

9. The computer program product of claim 8, wherein the historical context comprises of information based on previous interactions between the one or more users of the electronic communications, type of electronic communications be sent, metadata of the communications, sentiment of the metadata, natural language indicators of sensitive information, additional recipients copied on the electronic communication, evolution of the electronic communications, previous communication threads flagged as violation of internal policies, presence of locked and check-in/check out status of one or more documents relating to the electronic communications and time decay algorithm.

10. The computer program product of claim 9, wherein the time decay algorithm comprises:

program instructions to determine a creation date of one or more documents;

program instructions to determine last open date for the one or more documents;

program instructions to determine whether new information has been added to the one or more document by comparing the current size of the one or more document against and last open date; and program instructions to determine whether the creation date, last open date and new information has been added and comparing against a pre-determined time decay table.

11. The computer program product of claim 10, wherein the determining the wherein contextual information related to the one or more documents further comprises, presence of inline notes and comments and other documents for comparison that resides on the or more user's computer.

12. The computer program product of claim 8, wherein action plan further comprises of prompting the one or more users to remove sensitive information from the document and sending the electronic communication without the document.

13. The computer program product of claim 8, wherein one or more risk scores further comprises of file risk score (FRS), role risk score (RRS), historical risks score (HRS) and context risk score (CRS).

14. The computer program product of claim 8, wherein the one or more predetermined thresholds comprises of file risk threshold (FRT), role risk threshold (RRT), historical risk threshold (HRT) and context risk threshold (CRT).

15. A computer system for cognitively processing documents to ameliorate inadvertent sharing of sensitive information during electronic communications, the computer system comprising:

one or more computer processors;

one or more computer readable storage media;

program instructions stored on the one or more computer readable storage media for execution by at least one of the one or more computer processors, the program instructions comprising:

program instructions to determine a first context, by leveraging machine learning, of an electronic communication between one or more users being prepared for transmission further comprises of comprises of, reviewing and scoring the electronic communications based on a natural language indicators of sensitive information, content of the electronic communication and recipients of the electronic communication;

program instructions to determine a historical context, by leveraging machine learning, of the electronic communication;

program instructions to determine, by leveraging machine learning, one or more risk scores based on the first context and the historical context;

program instructions to assign, by leveraging machine learning, the one or more risk scores to the first context and the historical context;

program instructions to determine, by leveraging machine learning, whether the one or more risk scores exceed one or more predetermined thresholds based on machine learning; and responsive to the one or more risk scores exceeding the one or more predetermined thresholds, program instructions to execute, by leveraging machine learning, an action plan.

16. The computer system of claim 15, wherein the historical context comprises of information based on previous interactions between the one or more of the electronic communications, type of electronic communications be sent, metadata of the communications, sentiment of the metadata, natural language indicators of sensitive information, additional recipients copied on the electronic communication, evolution of the electronic communications, previous communication threads flagged as violation of internal policies presence of locked and check-in/check out status of one or more documents relating to the electronic communications and time decay algorithm.

17. The computer system of claim 16, wherein the time decay algorithm comprises:

program instructions to determine a creation date of one or more documents;

program instructions to determine last open date for the one or more documents;

program instructions to determine whether new information has been added to the one or more document by comparing the current size of the one or more document against and last open date; and program instructions to determine whether the creation date, last open date and new information has been added and comparing against a pre-determined time decay table.

18. The computer system of claim 17, wherein the determining the wherein contextual information related to the one or more documents further comprises, presence of inline notes and comments and other documents for comparison that resides on the or more user's computer.

19. The computer system of claim 15, wherein action plan further comprises of prompting the or more users to remove sensitive information from the document and sending the electronic communication without the document.

20. The computer system of claim 15, wherein one or more risk scores further comprises of file risk score (FRS), role risk score (RRS), historical risks score (HRS) and context risk score (CRS).

* * * * *